(12) United States Patent
Park

(10) Patent No.: US 8,872,735 B2
(45) Date of Patent: Oct. 28, 2014

(54) HEAD MOUNTED DISPLAY FOR ADJUSTING AUDIO OUTPUT AND VIDEO OUTPUT IN RELATION TO EACH OTHER AND METHOD FOR CONTROLLING THE SAME

(71) Applicant: LG Electronics Inc., Seoul (KR)

(72) Inventor: Hyorim Park, Seoul (KR)

(73) Assignee: LG Electronics Inc., Seoul (KR)

( * ) Notice: Subject to any disclaimer, the term of this patent is extended or adjusted under 35 U.S.C. 154(b) by 189 days.

(21) Appl. No.: 13/741,022

(22) Filed: Jan. 14, 2013

(65) Prior Publication Data

US 2014/0043211 A1    Feb. 13, 2014

(30) Foreign Application Priority Data

Aug. 9, 2012    (KR) .................. 10-2012-0087044

(51) Int. Cl.
*G09G 5/00*    (2006.01)
*G02B 27/01*    (2006.01)

(52) U.S. Cl.
CPC .............. *G02B 27/017* (2013.01); *G02B 27/01* (2013.01)
USPC ................... 345/8; 345/7; 345/633; 359/630

(58) Field of Classification Search
USPC .................................. 345/7, 8, 633; 359/630
See application file for complete search history.

(56) References Cited

U.S. PATENT DOCUMENTS

| | | | |
|---|---|---|---|
| 2006/0086022 A1* | 4/2006 | Would et al. ..................... | 40/584 |
| 2008/0025529 A1* | 1/2008 | Keohane et al. ............... | 381/104 |
| 2008/0288876 A1* | 11/2008 | Fleming ........................ | 715/761 |
| 2010/0275033 A1 | 10/2010 | Gillespie et al. | |
| 2010/0293468 A1* | 11/2010 | Thijssen ........................ | 715/727 |
| 2011/0221669 A1* | 9/2011 | Shams et al. .................. | 345/156 |
| 2011/0246943 A1 | 10/2011 | Fujibayashi | |

FOREIGN PATENT DOCUMENTS

| | | |
|---|---|---|
| KR | 10-2009-0053776 A | 5/2009 |
| KR | 10-2009-0106060 A | 10/2009 |
| KR | 10-2011-0013997 A | 2/2011 |

OTHER PUBLICATIONS

Kern et al., "Context-Aware Notification for Wearable Computing," Proceedings of the Seventh IEEE International Symposium on Wearable Computers (ISWC'03), White Plains, New York, NY, Oct. 21-23, 2003, 8 pages.

* cited by examiner

*Primary Examiner* — Koosha Sharifi-Tafreshi
(74) *Attorney, Agent, or Firm* — Birch, Stewart, Kolasch & Birch, LLP

(57) ABSTRACT

A head mounted display and a control method thereof are discussed. The head mounted display is designed to adjust an audio output and a video output of the head mounted display in relation to each other using the control method.

30 Claims, 14 Drawing Sheets

FIG. 7
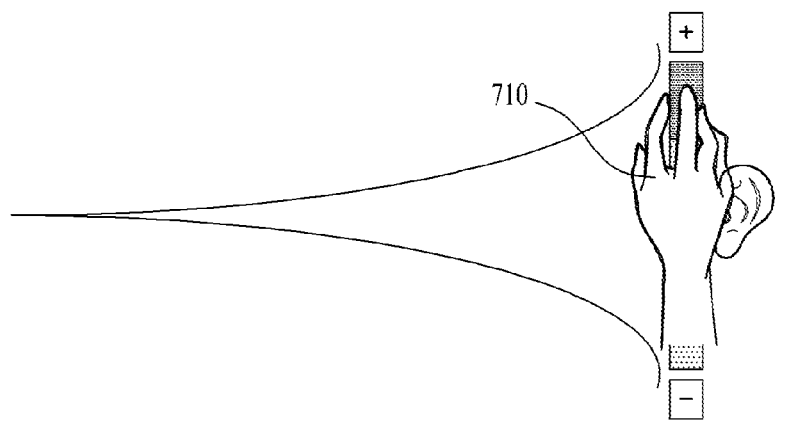
(a)
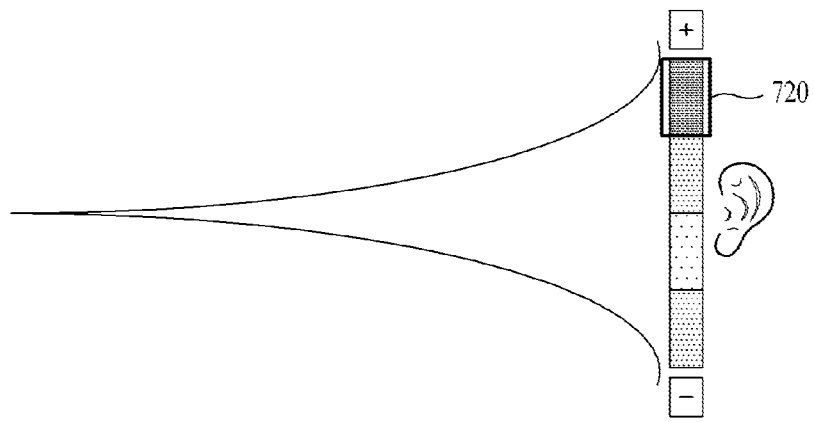
(b)

| Level | Video Data | Audio Data | Level |
|---|---|---|---|
| 1 | - | Event occurrence content guidance | 3 |
| 2 | Event occurrence notice | Event occurrence notice | 2 |
| 3 | Event occurrence content guidance | - | 1 |

HEAD MOUNTED DISPLAY FOR ADJUSTING AUDIO OUTPUT AND VIDEO OUTPUT IN RELATION TO EACH OTHER AND METHOD FOR CONTROLLING THE SAME

This application claims the priority benefit of the Korean Patent Application No. 10-2012-0087044, filed on Aug. 9, 2012, which is hereby incorporated by reference as if fully set forth herein.

BACKGROUND OF THE INVENTION

1. Field of the Invention

The present invention relates to a head mounted display and a control method thereof, and more particularly to a method for adjusting an audio output and a video output of a head mounted display in relation to each other.

2. Discussion of the Related Art

A Head Mounted Display (HMD) is generally referred to as a variety of image display devices, which is worn on the head like eye-glasses and displays an image. With the tendency of small size and light weight of digital devices, various wearable computers or displays have been developed, and some general HMDs are also available. In addition to providing a simple display function, the general HMD may be combined with augmented reality and N-screen techniques, providing a user with convenience.

As described above, the general HMD is a device that the user wears on the user's head and allows the user to view contents including menus, etc. However, the HMD is often required to minimize its video output in certain situations, for example, when the user is driving. But the minimizing the video output of the HMD may cause the user of the HMD to fail to acquire data via the video output.

In another case, the user may be provided with an audio output while the user is already listening to another audio output via the HMD. However, this may confuse the user and is not a desirable situation.

In addition, the HMD may often be required to output only the audio data or only the video data according to a usage environment or user selection. However, in this case, the general HMD does not provide user interfaces to control such operations in a user-friendly manner.

SUMMARY OF THE INVENTION

Accordingly, the present invention is directed to a head mounted display (HMD) for adjusting an audio output and a video output in relation to each other and a method for controlling the same that substantially obviate one or more problems due to limitations and disadvantages of the related art.

One object of the present invention is to provide a head mounted display, which adjusts an audio output and a video output in relation to each other by decreasing or increasing the data output level of the video output if the data output level of the audio output increases or decreases according to a user environment.

Another object of the present invention is to provide a head mounted display, which adjusts an audio output and a video output in relation to each other by decreasing or increasing the data output level of the audio output if the data output level of the video output increases or decreases according to a user environment.

A further object of the present invention is to define a control interface for a head mounted display that adjusts an audio output and a video output in relation to each other.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an embodiment a control method of a head mounted display that adjusts an audio output and a video output of the head mounted display in relation to each other, includes providing a first user interface of a control interface for adjusting the audio output and the video output in relation to each other, wherein the first user interface includes an indicator for adjusting a data output level of the audio output and a data output level of the video output in relation to each other, receiving, by the head mounted display, an input signal corresponding to a movement the indicator, and adjusting, by the head mounted display, the data output level of the audio output and the data output level of the video output so as to be inversely related to each other according to the received input signal.

In accordance with another aspect of the present invention, a head mounted display to adjust an audio output and a video output in relation to each other, includes an input unit, an audio output unit configured to output audio data, a video output unit configured to output video data and a controller configured to provide a first user interface of a control interface for adjusting the audio output and the video output in relation to each other, wherein the first user interface includes an indicator for adjusting a data output level of the audio output and a data output level of the video output in relation to each other, receive, via the input unit, an input signal corresponding to a movement of the indicator, and adjust the data output level of the audio output and the data output level of the video output so as to be inversely related to each other according to the received input signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 7(a) and 7(b) are diagrams showing examples of adjusting the data output level of an audio output of the HMD in the changed control interface of FIG. 6 according to the present invention;

DETAILED DESCRIPTION OF THE PREFERRED EMBODIMENTS

Although the terms used in the following description are selected, as much as possible, from general terms that are widely used at present while taking into consideration of the functions obtained in accordance with the present invention, these terms may be replaced by other terms based on intensions of those skilled in the art, customs, emergence of new technologies, or the like. Also, in a particular case, terms that are arbitrarily selected by the applicant of the present invention may be used. In this case, the meanings of these terms may be described in corresponding description parts of the invention. Accordingly, it should be noted that the terms used herein should be construed based on practical meanings thereof and the whole content of this specification, rather than being simply construed based on names of the terms.

Moreover, the embodiments of the present invention will now be described in detail with reference to the accompanying drawings and the disclosure illustrated in the accompanying drawings. However, it is to be understood that the invention is not limited to or restricted by the following embodiments and examples.

Figure 1:
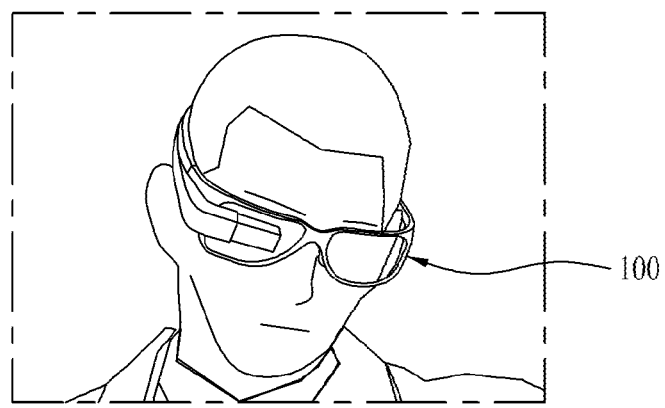
FIG. 1 is a diagram showing an example of a head mounted display (HMD) and a user who wears the HMD according to the present invention.

FIG. 1 is a diagram showing an example of an HMD 100 and a user who wears the HMD according to the present invention. The HMD 100 according to the present invention, as shown in FIG. 1, may be worn on the head of the user. The HMD 100 may display, for example, content via a display unit equipped therein, and may output, for example, audio associated with the content via an audio output unit equipped therein. This will be described below in detail with reference to FIG. 2.

The HMD 100 may be operated in conjunction with a digital device after the user wears the HMD 100. This will be described below in detail with reference to FIG. 20.

Figure 2:
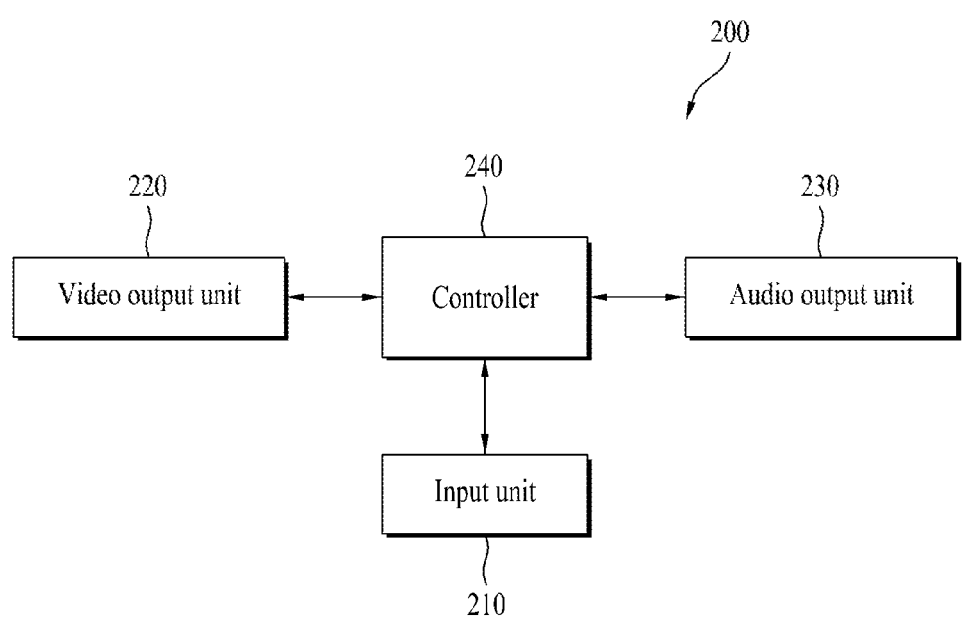
FIG. 2 is an example of a functional block diagram of the HMD according to the present invention.

FIG. 2 is a functional block diagram showing an example of an HMD 200 according to the present invention. It is noted that FIG. 2 shows an exemplary embodiment provided to explain the present invention, and omitting some constituent modules or adding new constituent modules according to demands of those skilled in the art is within the scope of the present invention. The components of the HMD 200 can be equally provided in the HMD 100 in FIG. 1 or any other HMD discussed below. Further the HMD 200 can be implemented to have an appearance of the HMD 100 shown in FIG. 1 or any other appearance.

As shown in FIG. 2, the HMD 200 according to the embodiment of the present invention may include an input unit 210, a video output unit 220, an audio output unit 230, and a controller 240. All the components of the HMD 200 are operatively coupled and configured.

The input unit 210 may sense various user inputs and user environments, and transmit an input signal corresponding to such inputs/environments to the controller 240 to allow the controller 240 to perform any corresponding operation or adjustments. To this end, the input unit 210 may include one or more sensing means.

The sensing means can be a sensor which can include one or more of the following: a touch sensor, an audio sensor, a video sensor, a GPS, a pressure sensor, a temperature sensor, a gravity sensor, a geomagnetic sensor, a motion sensor, a gyro sensor, an accelerometer, an infrared sensor, an inclination sensor, a brightness sensor, a height sensor, an olfactory sensor, a depth sensor, a bending sensor, and/or an image capturing sensor, for example. The sensing means may sense various user inputs and user environments and transmit the sensed results to the controller 240.

In the following description, the input unit 210 of the HMD 200 according to the present invention will be described as including a touch sensor that senses a user touch signal by way of example. However, it will be appreciated that the input unit 210 is not restricted to the aforementioned touch sensing means.

The input unit 210 may receive an input signal for a control interface to adjust the data output levels between an audio output and a video output of the HMD. The controller 240 can control and display, via the video output unit 220, the control interface for the HMD. The control interface is preferably a user interface to allow the user of the HMD to adjust the data output level of the audio output of the HMD and the data output level of the video output of the HMD in relation to each other. The control interface is preferably displayed in the field of vision of the user by the HMD (e.g., under control of the controller 240) so that the user wearing the HMD can see the control interface and respond to the control interface to adjust the data output level of at least one of the audio and video outputs of the HMD. The field of vision for the user can be an area or space located a certain distance from the user wearing the HMD. The control interface can include a slide bar with an indicator displayed in the field of vision of the user wearing the HMD and the user can move this indicator to control the data output levels of the HMD. For instance, when the user touches the control interface to move the indicator of the control interface to a desired level, the input unit 210 may receive an input signal corresponding to the movement of the indicator. This will be described later in detail with reference to FIG. 3.

The video output unit 220 outputs and displays various images and contents on a display screen. The display screen can be a physical screen such as a screen associated with the HMD or a screen of a mobile terminal or electronic device communicating with the HMD, or can be an arbitrarily created screen such as an image of a screen displayed in the space (e.g., field of vision of the user). More specifically, the video output unit 220 may output an image based on the contents executed in the controller 240 or a control command of the controller 240. Also, the video output unit 220 may display the control interface used to adjust the data output levels between the audio output and the video output of the HMD. The control interface will be described below in detail with reference to FIG. 3.

The audio output unit 230 may include a speaker and an earphone, for example. The audio output unit 230 may output audio/sounds based on the contents executed in the controller 240 or a control command of the controller 240.

The controller 240 may receive, manage and/or execute external contents received via a data communication, or pre-stored internal contents, for example. Also, the controller 240 may execute various applications, and process internal data of the HMD 200. The controller 240 of the HMD can receive contents and data from external devices such a mobile terminal or electronic device (e.g., smart phones, laptops, tablets, computers, digital TVs, servers, etc.). The controller 240 then can manage the received contents and data and can output them via at least one of the video output unit 220 and the audio output unit 230. The controller 240 can also transmit those contents and data to external devices.

The controller 240 may move the indicator of the control interface in response to the input signal received via the input unit 210. The controller 240 may adjust the data output level of the audio output of the HMD and/or the data output level of the video output of the HMD so that they are inversely related to each other based on a position of the moved indicator. Being inversely related here can mean that the data output level of the audio output and the data output level of the video output are adjusted to be inversely proportional to each other, or can mean that there is some inverse relation between these output levels. For instance, if the data output level of the video output is increased, then the data output level of the audio output may decrease, or vice versa.

Based on the aforementioned output level adjustment of the controller 240 in response to the user's control of the control interface such as the indicator, the video output unit 220 then outputs video data at the adjusted data output level of the video output, and the audio output unit 230 outputs audio data at the adjusted data output level of the audio output. For example, if the data output level of the video output unit 220 increases or decreases with the output level adjustment control of the controller 240, the data output level of the audio output unit 230 may be correspondingly decreased or increased. This will be described below in detail.

Figure 3:
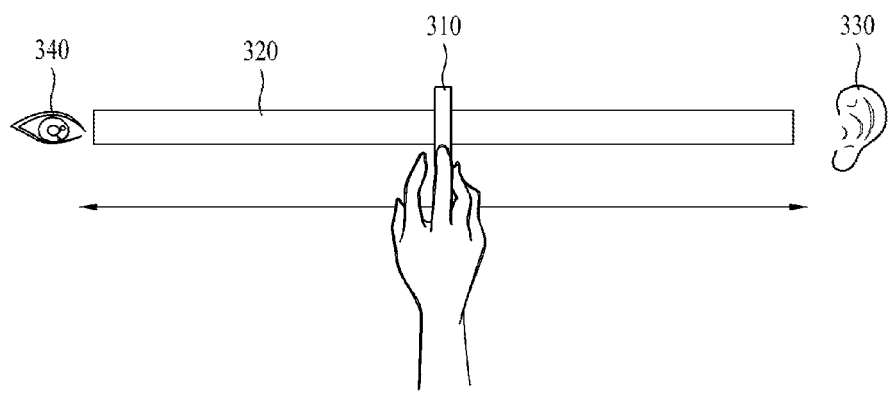
FIG. 3 is a diagram showing an example of a control interface for the HMD according to the present invention.

FIG. 3 is a diagram showing an example of a control interface for the HMD according to the present invention. As shown in FIG. 3, the HMD according to the present invention may provide a control interface to allow the user to simultaneously adjust an audio output and a video output of the HMD through a simple operation.

The control interface may include a slide bar 320 on which an indicator 310 is movable to adjust the data output levels between an audio output and a video output of the HMD, i.e., to adjust the data output level of the audio output and/or the data output level of the video data in relation to each other. If the user, e.g., via the user's hand, moves the indicator 310 of the control interface displayed in the field of vision of the user to a position 330 where the data output level of the HMD's audio output is to be increased, then the HMD may perform adjustments to increase the data output level of its audio output and at the same time decrease the data output level of its video output. On the other hand, if the user moves the indicator 310 of the control interface to a position 340 where the data output level of the HMD's video output is to be increased, the HMD may perform adjustments to increase the data output level of its video output and at the same time decrease the data output level of its audio output. The adjustment of the data output levels of the audio and video outputs of the HMD is preferably done in inverse relation to each other, but may be in other relations.

As such, the HMD according to the present invention enables the simultaneous adjustment of the data output levels of the HMD's audio output and video output in response to a movement of the indicator 310, which advantageously results in an enhanced user convenience. In the present invention, the audio output and video output refer respectively to the audio and video outputs of the HMD. However, the invention is not limited thereto, and the audio and video outputs can be outputs of one or more external sources/devices.

In some situations, it may be desirable to secure a clear view of the user (for example, if the user is driving). Then, it may be desirable to block a video output of the HMD and replace the video output with an audio output of the HMD. Also, if audio outputs of the HMD overlap each other (for example, if a first audio content of the HMD is executed while the user is executing a second audio content of the HMD), it may be desirable to block a particular audio output and simultaneously replace the corresponding audio output with the video output. To this end, the HMD according to the present invention may set a critical point on the control interface, such that an audio output or a video output of the HMD is blocked if the indicator passes through the critical point. This example is discussed referring to FIG. 4.

Figure 4:
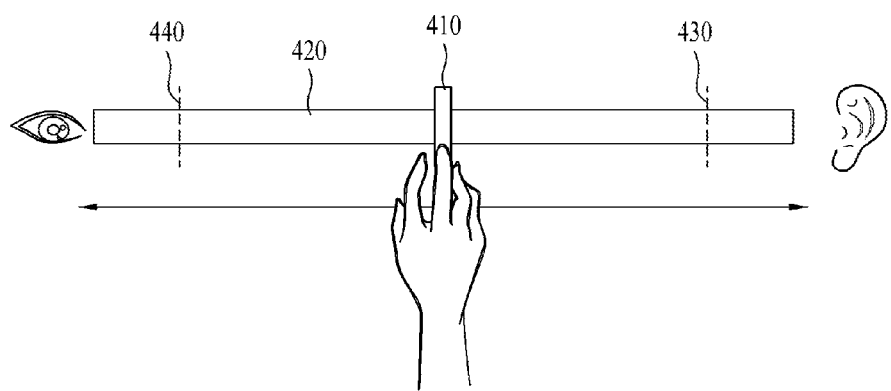
FIG. 4 is a diagram showing an example of a control interface for the HMD according to the present invention, in which a first critical point and a second critical point are provided.

FIG. 4 is a diagram showing an example of a control interface for the HMD according to the present invention, in which a first critical point and a second critical point are provided on the control interface.

As shown in FIG. 4, a control interface for the HMD can include a slide bar 420 having a movable indicator 410 and first and second critical points 430, 440 previously set. The first critical point 430 is for maximizing the audio output while the second critical point 440 is for maximizing the video output. The HMD may be set to block the video output of the HMD if the indicator 410 displayed in the field of the vision of the user wearing the HMD is moved by the user to pass through the first critical point 430 with respect to the audio output. In this case, the HMD may be set to maximize the data output level of the audio output of the HMD, to ensure that the user can acquire sufficient audio data to compensate for the video data that the user cannot use or access because the video output has been blocked per the user's moving of the indicator 410.

On the other hand, the HMD may be set to block the audio output of the HMD if the user moves the indicator 410 to pass through the second critical point 440 with respect to the video output on the slide bar 420. In this case, the HMD may set to maximize the data output level of the video output, to ensure that the user can acquire sufficient video data to compensate for audio data that the user cannot use or access because the audio output has been blocked per the user's moving of the indicator 410.

As such, owing to the ability to selectively block the audio output or video output, the HMD according to the present invention provides an advantage in that the user can select an output suitable for specific circumstances as necessary. In addition, the HMD has another advantage of providing the user with required sufficient data by setting the data output level of a selected output (i.e. an audio output or a video output of the HMD) to the maximum in consideration of the fact that the other video output or audio output is blocked.

Figure 5:
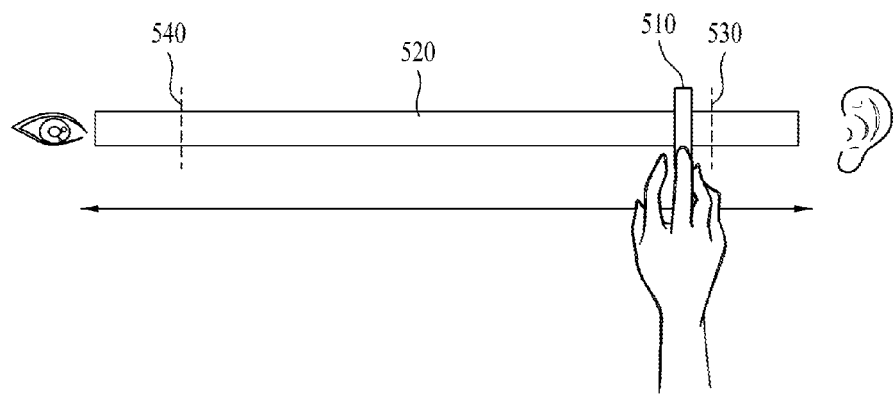
FIG. 5 is a diagram showing an example of a control interface for the HMD according to the present invention, in which an indicator is moved toward a first critical point to possibly block a video output of the HMD.
Figure 6:
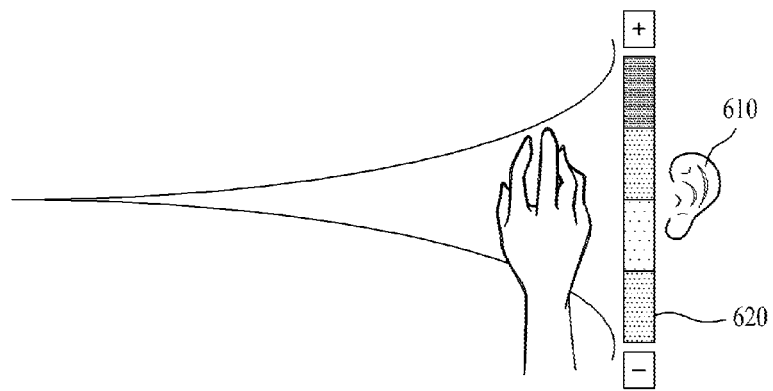
FIG. 6 is a diagram showing an example of a control interface for the HMD according to the present invention, in which a user interface is changed to re-adjust an audio output of the HMD if the indicator of FIG. 5 passes through the first critical point.

FIG. 5 is a diagram showing an example of a control interface for the HMD according to the present invention, in which an indicator of the control interface is moved towards a first critical point for blocking a video output. FIG. 6 is a diagram showing an example of a control interface for the HMD according to the present invention, in which the control interface is changed to re-adjust an audio output of the HMD if an indicator of the control interface passes through a first critical point.

As shown in the example of FIG. 5, a control interface for the HMD can include a slide bar 520 displayed in the field of vision of the user wearing the HMD (e.g., glasses). An indicator 510 can then be moved on the slide bar 520 by the user. Thus, the user may move the indicator 510 to pass through a first critical point 530 or a second critical point 540. If the user moves the indicator 510 to pass through the first critical point 530, the HMD may change a User Interface (UI) of the control interface to one shown in FIG. 6, in order to re-adjust the data output level of the audio output of the HMD.

More specifically, in one example, if the indicator 510 is moved and passes through the first critical point 530, the HMD blocks a video output of the HMD, and at the same time sets the data output level of the audio output to the maximum. However, even if the user depends on only the audio output, the user may not want to maximize the data output level of the audio output. Therefore, as a variation, the HMD may display another user interface of the control interface for selectively adjusting the data output level of the audio output.

To this end, as shown in FIG. 6, the HMD may provide a control interface, a UI of which is changed to re-adjust the data output level of the audio output 610. The case of the control interface having the changed UI is configured such that a bar 620 thereof is sectionalized to correspond to different data output levels of the audio output 610. If the user selects a particular section of the bar 620, accordingly, the HMD may re-adjust the data output level of the audio output 610 to the level of the selected section. The bar 620 shown in FIG. 6 is set such that the data output level increases toward the top section and decreases toward the bottom section. However, the disclosure is not limited to the above-described form, and vice versa or other variations are possible.

FIGS. 7(*a*) and 7(*b*) are diagrams showing an example of adjusting the data output level of an audio output of the HMD in a changed control interface for the HMD according to the present invention.

As shown in FIG. 7(*a*), if the HMD provides a control interface having a changed UI in the shape of a sectioned bar, the HMD may receive a section of the bar selected by a user 710 of the HMD wearing the HMD. The HMD may then receive an input signal for selecting a particular section among a plurality of sections on the bar of the control interface. Alternatively, the HMD may detect a point at which a drag signal, maintained from before the user provides the control interface having the changed UI, is released, and recognize that a section corresponding to the release point is selected. In this way, if the user selects a section 720 of the bar of the control interface as shown in FIG. 7(*b*), the HMD may re-adjust the data output level of an audio output of the HMD to the output level designed for the selected section 720.

In the above description, an operation of providing the control interface having the changed UI when the indicator of the slide bar passes through the first critical point, and a subsequent operation of re-adjusting the data output level of the audio output have been described separately. However, these operations may be carried out sequentially with only a single user touch. For example, starting from a user touch signal applied to the indicator on the slide bar, the indicator may be moved as the user drags the indicator without discontinuing touch. This will be described below with reference to FIGS. 8(*a*)-8(*c*) which can be equally applied to the situation of blocking the video output.

Figure 8:
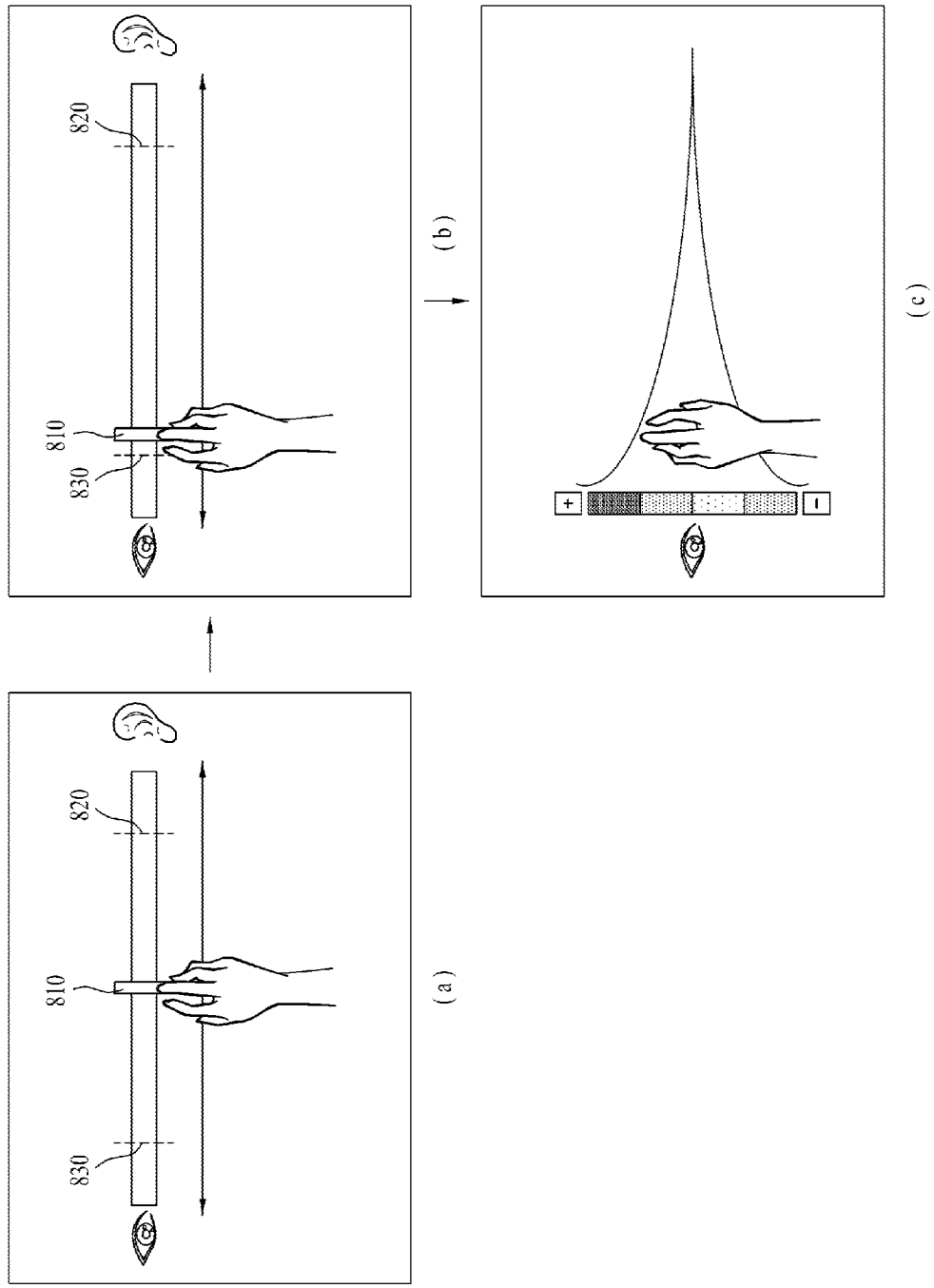
FIGS. 8(a), 8(b) and 8(c) are diagrams showing an example of a control interface for the HMD according to the present invention, in which a user interface is changed and displayed as an indicator passes through a second critical point.

FIGS. 8(*a*)-8(*c*) are diagrams showing an example of a control interface for the HMD according to the present invention, in which a UI is changed and displayed as an indicator on a slide bar of the control interface passes through a second critical point. A series of operations as shown in FIGS. 8(*a*) to 8(*c*) may be sequentially carried out in response to a user's single drag signal or action.

As shown in FIG. 8(*a*), a control interface of the HMD can include a slide bar displayed with an indicator 810. The user may move the indicator 810 to a first critical point 820 or a second critical point 830 by touching and dragging the indicator 810. As shown in FIG. 8(*b*), if the user moves the indicator 810 to the second critical point 830, the HMD determines whether or not the indicator 810 has passed through the second critical point 830 to selectively block an audio output of the HMD. Also, in order to re-adjust the data output level of a video output of the HMD at the same time, the HMD may provide a control interface having a changed UI as shown in FIG. 8(*c*). This changed UI is similar to that shown in FIG. 6, but is for selecting a specific output level of the video output of the HMD.

That is, as the user moves the indicator 810 to pass the second critical point 830, the HMD automatically displays the UI of FIG. 8(*c*) and the user can continuously move the hand up and down to the desired section of the displayed bar of the UI and releases the touch at the desired section on the bar to indicate the user's selection of the desired output level of the video output. In this case, the HMD detects the bar section of the control interface having the changed UI corresponding to the point at which the user's touch signal has been released, and re-adjusts the data output level of the video output to the data output level corresponding to the detected section. That is, the HMD may determine whether or not the movement of the indicator is completed, and re-adjust the data output level of the video output according to a position where the movement of the indicator is completed.

In this way, the HMD according to the present invention may provide the control interface having the changed UI, and re-adjust the data output level to an output value selected by a user's single touch.

Meanwhile, the HMD according to an embodiment of the present invention may adjust the data output level of the audio output and the data output level of the video output so as to be inversely related to each other, in addition to selectively blocking the audio output or the video output. In this way, the user may acquire required data via the video output without disturbance by the audio output, and may acquire required data via the audio output without disturbance by the video output as needed. This will hereinafter be described in detail.

Figure 9:
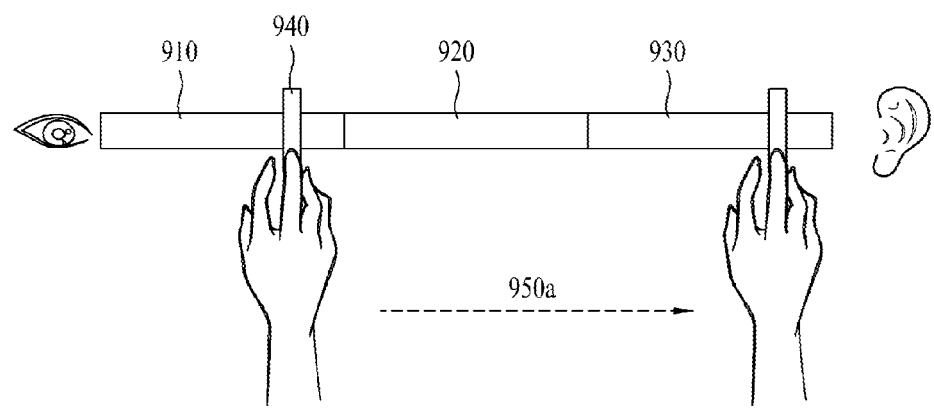
FIG. 9 is a diagram showing an example of setting the data output levels of an audio output and a video output of the HMD in a control interface for the HMD according to the present invention.

FIG. 9 is a diagram showing an example of setting or adjusting the data output levels of an audio output and a video output of the HMD using a control interface for the HMD according to the present invention.

In this example, each of the data output level of an audio output of the HMD and the data output level of a video output of the HMD may be, for example, divided into three levels. In this case, the number of the divided data output levels is not limited to three but can be other numbers. However, since the audio output and the video output are adjusted in relation to each other, the number of different data output levels of the audio output and the number of different data output levels of the video output may be equal to each other.

As shown in FIG. 9, if the data output level is divided into three levels, the HMD may divide a slide bar of the control interface into three sections 910, 920 and 930, and set a specific different data output level for each of the sections. For example, the HMD may set the data output level of an audio output of the HMD to increase as an indicator 940 on the displayed slide bar is moved from the first section 910 to the third section 930 and the data output level of a video output of the HMD to decrease as the indicator 940 is moved from the first section 910 to the third section 930.

If the user moves the indicator 940 in an audio output increase direction 950a, the data output level of the audio output of the HMD becomes the maximum while the data output level of the video output of the HMD becomes the minimum. In another example, the HMD may be preset such that the audio output of the HMD is blocked (not output) while only the video output of the HMD is carried out (output) if the indicator 940 is positioned within the first section 910, and such that the video output is blocked while only the audio output is carried out if the indicator 940 is positioned within the third section 930.

Although the examples of setting the data output levels of an audio output and a video output of the HMD so as to be inversely related to each other according to a position of an indicator of the control interface have been described above, the data output levels of the audio output and the video output may be set equally according to the user's selection.

Figure 10:
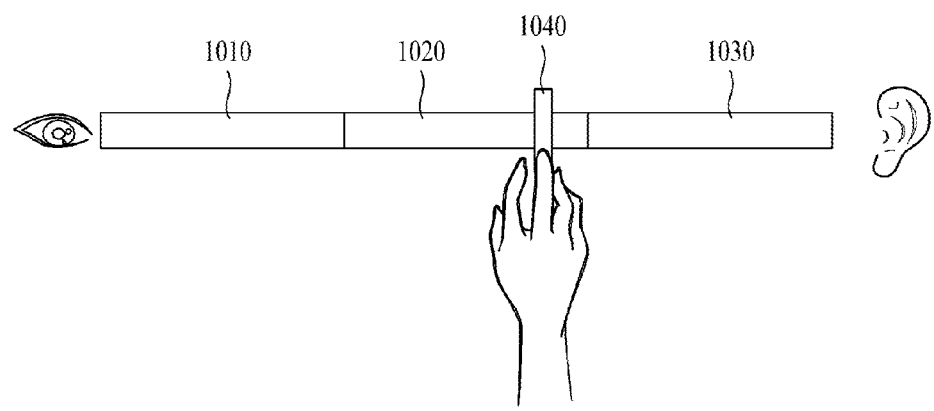
FIG. 10 is a diagram showing another example of setting the data output levels of an audio output and a video output of the HMD in a control interface for the HMD according to the present invention.

FIG. 10 is a diagram showing another example of setting the data output levels of an audio output and a video output of the HMD in a control interface for the HMD according to the present invention. Similar to FIG. 9, in FIG. 10, the data output level is divided into three levels, and the data output levels of a video output and an audio output of the HMD are matched to respective bar sections of the control interface.

Accordingly, if the user moves an indicator 1040 on a slide bar of the control interface to a section 1010 corresponding to a first output level, only the video output of the HMD is carried out (with no audio output) or the data output level of the audio output of the HMD is set to the minimum (not being zero) with the video output being carried out. On the other hand, if the user moves the indicator 1040 to a section 1030 corresponding to a third output level, only the audio output is carried out (with no video output) or the data output level of the video output is set to the minimum (not being zero) with the audio output being carried out.

In this case, if the user moves the indicator 1040 to a section 1020 corresponding to a second output level, the HMD may set the data output level of the video output and the data output level of the audio output to be equal to each other. As such, the slide bar may be divided into an odd number of sections, and a center section of the slide bar may always be set such that it corresponds to where the data output levels of the audio output and the video output are equal to each other.

As described above, the HMD according to the present invention may adjust the data output levels of an audio output of the HMD and a video output of the HMD in relation to each other so as to be inversely related to each other, and may also set the data output levels of the video output and the audio output to be equal to each other.

The HMD according to an embodiment of the present invention may carry out general functions of the HMD if the data output levels of a video output of the HMD and an audio output of the HMD are set to be equal to each other, and may adjust the data output level of the video output and the data output level of the audio output in relation to each other as needed. In this way, the HMD according to the present invention advantageously achieves enhanced utility.

According to the various embodiments and examples of the present invention herein above and below, the data output level of an audio output of the HMD may include an output level which is or which is related to at least one of: an output volume of the audio output, an output time of the audio output, and an output data quantity of the audio output. In one example, if the data output level of the audio output is the output level related to or is the output data quantity of the audio output of the HMD, the data output level of the audio output may be divided into a first level at which no data is output, a second level at which an occurrence of an event is output as an alarm sound, and a third level at which an audio content associated with an occurrence of an event is output.

Also, according to the various embodiments and examples of the present invention discussed hereinabove and below, the data output level of a video output of the HMD may include an output level which is or is related to at least one of: the size of an output region of the video output, an output resolution of the video output, an output time of the video output, and an output data quantity of the video output. In one example, if the data output level of the video output is the output level related to or is the output data quantity of the video output, the data output level of the video output may be divided into a first level at which no data is displayed, a second level at which an occurrence of an event is displayed using numbers or icons, and a third level at which a video content associated with an occurrence of an event is displayed.

Figures 11, 12:
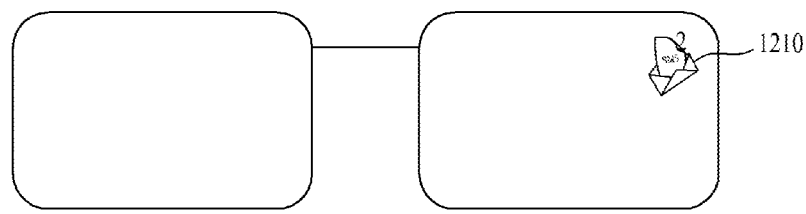
FIG. 11 is a diagram showing an example of a relationship between the data output levels of an audio output and a video output in the HMD according to the present invention.
FIG. 12 is a diagram showing an example of data output based on the data output level of a video output in the HMD according to the present invention.

FIG. 11 is a diagram showing an example of possible data output levels of an audio output and a video output and their relationship to each other in the HMD according to the present invention. FIG. 11 shows the case in which the data output level is the output data quantity. As shown in FIG. 11, the data output level for each of the video and audio outputs of the HMD may be divided into a first level, a second level, and a third level. Here, the first level, second level, and third level of the video output may respectively match with or correspond to the third level, second level, and first level of the audio output in an inversely related manner.

As such, the HMD may match the data output level of its video output with the data output level of its audio output, such that the data output level of the audio output decreases while the data output level of the video output increases or the data output level of the audio output increases while the data output level of the video output decreases. The HMD can store the matched information such as the one shown in FIG. 11 therein. The HMD can also download or obtain this information through an external source for its internal use. This provides an advantage in that the quantity of data provided to the user has substantially no difference even if the data output levels of the video output and the audio output are changed.

For example, if the data output level of a video output of the HMD is at the first level, the data output level of an audio output of the HMD is automatically set to the third level according to the relationship shown in FIG. 11. In this case, the HMD does not display any data via the video output, while the HMD outputs an audio content associated with an occurrence of an event via the audio output.

Here, the event can include programs installed in the HMD or all factors having an influence on implementation of tasks. Additionally, the event may include guidance of data transmitted to or received from an external device that is communicating with the HMD, and notices related to the used content.

Hereinafter, the case in which a message reception event has occurred in a cellular phone or smart phone that is communicating with the HMD will be described as one embodiment. That is, the event in this example is a reception of a message on the phone.

The HMD may be set to output no audio data if the data output level of an audio output of the HMD is at a first level, and to indicate a message reception state via an alarm sound if the data output level of the audio output is at a second level. Also, the HMD may be set to output audio indicating a message sender and message content if the data output level of the audio output is at a third level.

Further, the HMD may be set to output no video data if the data output level of a video output is at the first level, and to display a message icon overlaid with a number that represents the number of newly received messages if the data output level of the video output is at the second level. The HMD may be set to display content of a received message and information on a message sender together if the data output level of the video output is at the third level.

However, the quantity of output data depending on the data output levels of the audio output and the video output may be changed based on a preset mode, and is not limited to the above-described embodiment.

An example in which the data output level of a video output of the HMD is related to an output data quantity of the video output will be described below with reference to FIGS. 12 to 14.

FIG. 12 is a diagram showing an example of data output based on the data output level of a video output in the HMD according to the present invention. If the data output level of the video output is at a first level (e.g., by the movement of the indicator by the user), a message icon and the number of received messages, designated by reference numeral 1210, may be displayed according to the set action for the first level. In this case, a required display region has a small size and does not disturb the visual field of the user. This advantageously allows the user to easily recognize the occurrence of an event.

Figure 13:
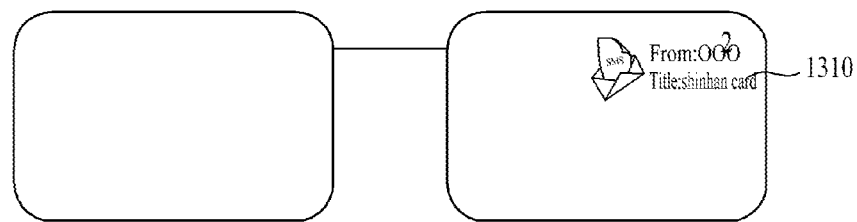
FIG. 13 is a diagram showing another example of data output based on the data output level of a video output in the HMD according to the present invention.

FIG. 13 is a diagram showing another example of data output based on the data output level of a video output in the HMD according to the present invention. If the data output level of the video output is at a second level (e.g., by the movement of the indicator on the slide bar by the user), a message icon, sender information, message title, and/or a part of message content, designated by reference numeral 1310, may be displayed according to the set action for the second level.

In this case, the user may acquire a greater quantity of detailed data as compared to that at the first level and the disturbance of the visual field of the user wearing the HMD is minimized. This may provide the user with helpful information. That is, the user can view sender information, a message title, or a part of message content, which allows the user to easily determine whether the received message is an important message to be confirmed immediately or a less important message that can be confirmed later.

Figure 14:
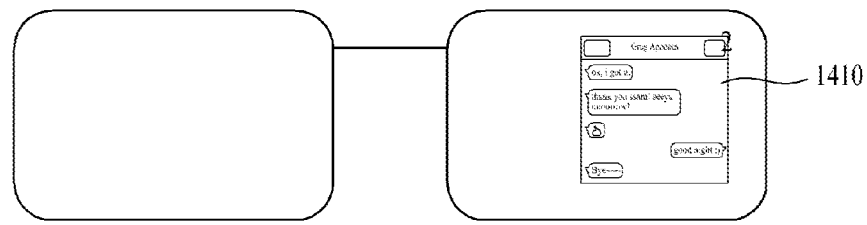
FIG. 14 is a diagram showing a further example of data output based on the data output level of a video output in the HMD according to the present invention.

FIG. 14 is a diagram showing a further example of data output based on the data output level of a video output in the HMD according to the present invention. If the data output level of the video output is at a third level, the entire message content 1410 may be displayed or even the history of a message may be displayed and an application associated with message may be executed, according to the set action for the third level. In this case, the user does not need to execute a separate application/program associated with the message separately and can acquire desired information immediately without unnecessary waste of time.

Figure 15:
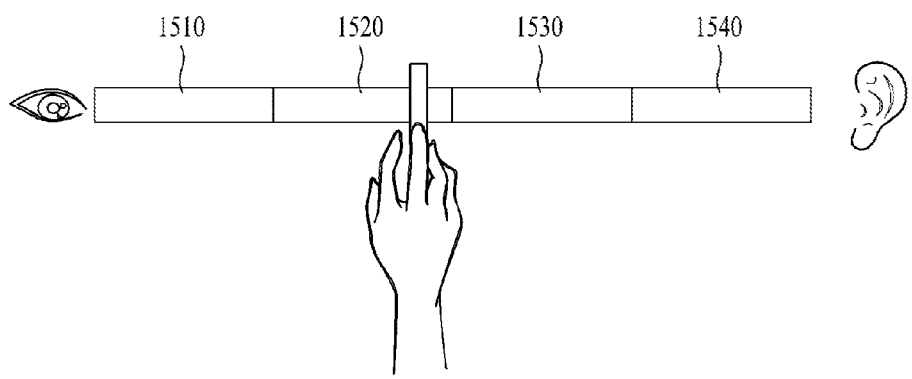
FIG. 15 is a diagram showing an example of a control interface for the HMD according to the present invention.

FIG. 15 is a diagram showing another example of a control interface for the HMD according to the present invention. Although the example of dividing the data output level into three levels has been described above, in FIG. 15 the output level is divided into four levels 1510, 1520, 1530 and 1540. In this case, as the user moves an indicator on a slide bar of the control interface toward the first level section 1510, the data output level of a video output of the HMD increases while the data output level of an audio output of the HMD decreases. That is, the HMD increases the data output level of the video output and at the same time automatically decreases the data output level of the audio output such that these adjustments are inversely related to each other. Also, as the user moves the indicator toward the fourth level section 1540, the data output level of the video output decreases while the data output level of the audio output increases so that these adjustments are inversely related to each other.

As such, the data output levels of the video output and the audio output may be set on a per level section basis. In this case, the HMD may set a particular output having a greater data output level as a main output and the other output having a smaller data output level as a sub output.

In the example of FIG. 15, if the user wearing the HMD sees the slide bar and selects the first level section 1510 or the second level section 1520 using the indicator on the slide bar, the HMD may set a video output of the HMD as a main output and an audio output of the HMD as a sub output. On the other hand, if the user selects the third level section 1530 or the fourth level section 1540 using the indicator on the slide bar, the HMD may set the audio output as a main output and the video output as a sub output.

The HMD according to the present invention, as described above in relation to FIG. 15, may provide a control interface after changing a UI of the control interface, in order to re-adjust the data output level of the main output or the sub output once the main output or the sub output has been set.

Figure 16:
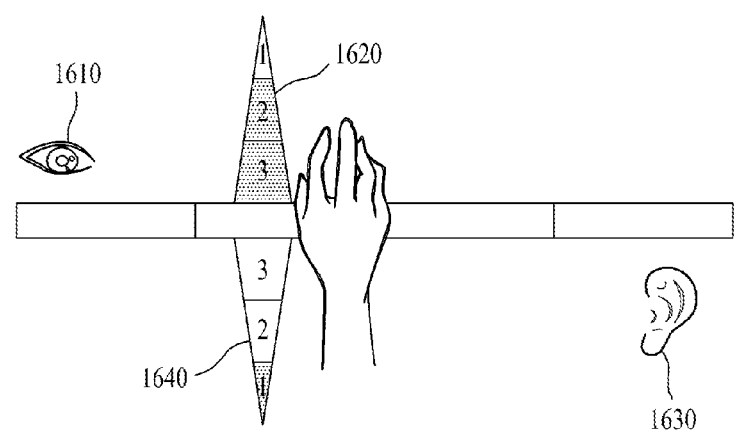
FIG. 16 is a diagram showing an example of re-adjusting the data output level of a main output in the HMD according to the present invention.

FIG. 16 is a diagram showing an example of re-adjusting the data output level of the main output in the HMD according to the present invention.

As occasion demands, the user may wish to re-adjust the data output level of a video output of the HMD although the video output has already been set as the main output. For example, the user may wish to increase or decrease the size of a display region for the HMD depending on the content that the user will view, may wish to increase or decrease the total display time of video data, or may wish to adjust the output data quantity.

To this end, as shown in FIG. 16, the HMD may provide a level adjustment menu 1620 to enable a re-adjustment of the data output level of a main output 1610 which in this example is the video output. The user can select one of the three levels displayed on the slide bar for the main output 1610. Level adjustment enables adjustment of at least one of the size of an output region, output resolution, output time, and output data quantity, for example, of the main output.

In this case, the HMD may display a data output level (menu) 1640 of a sub output 1630 which in this example is the audio output and may allow the user to re-adjust even the data output level of the sub output 1630 using the displayed data output level menu 1640.

Figure 17:
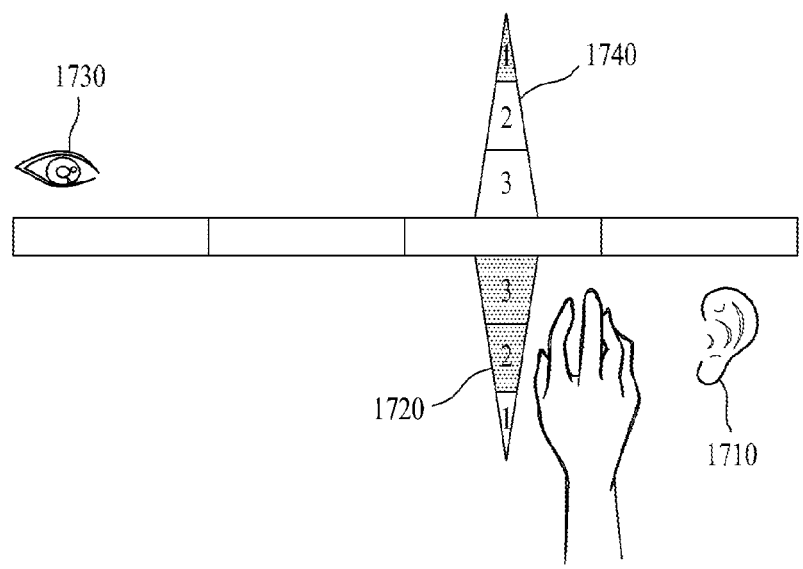
FIG. 17 is a diagram showing another example of re-adjusting the data output level of a main output in the HMD according to the present invention.

FIG. 17 is a diagram showing another example of re-adjusting the data output level of a main output in the HMD according to the present invention.

As occasion demands, the user may wish to re-adjust the data output level of an audio output of the HMD although the audio output has already been set as a main output. For example, the user may wish to increase or decrease an output volume depending on the content that the user will listen to, may wish to increase or decrease the total output time of the audio data, or may wish to adjust the output data quantity.

To this end, as shown in FIG. 17, the HMD may provide a level adjustment menu 1720 to enable a re-adjustment of the data output level of a main output 1710 which in this example is the audio output. The user can select one of the three levels displayed on the slide bar for the main output 1710. Level adjustment enables adjustment of at least one of an output volume, output time, and output data quantity, for example.

In this case, the HMD may display a data output level (menu) 1740 of a sub output 1730 which in this example is the video output and may allow the user to re-adjust even the data output level of the sub output 1730 using the displayed level menu 1740.

Meanwhile, the control interface for the HMD according to the present invention is not limited to the above-described embodiment, and may include all forms in which an audio output and a video output are adjusted in relation to each other.

Figure 18:
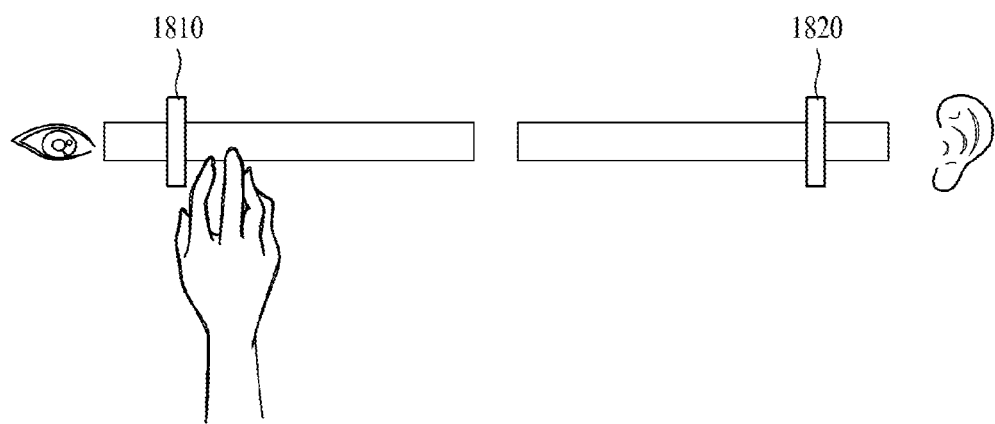
FIG. 18 is a diagram showing a further example of a control interface for the HMD according to the present invention.

FIG. 18 is a diagram showing a further example of a control interface for the HMD according to the present invention. Unlike the above-described control interfaces, FIG. 18 may display a control interface to adjust an audio output and a control interface to adjust a video output separately.

If the user moves an indicator 1810 used to adjust the data output level of an audio output of the HMD, the HMD may automatically and correspondingly move an indicator 1820 used to adjust the data output level of a video output of the HMD, thereby enabling the automated adjustment of the data output level of the video output in a manner inversely related to the adjustment of the data output level of the video output according to the movement of the indicators. On the contrary, if the user moves the indicator 1820 used to adjust the data output level of the video output, the HMD may automatically and correspondingly move the indicator 1810 used to adjust the data output level of the audio output, thereby enabling the automated adjustment of the data output level of the audio output in a manner inversely related to the adjustment of the data output level of the video output according to the movement of the indicators.

Figure 19:
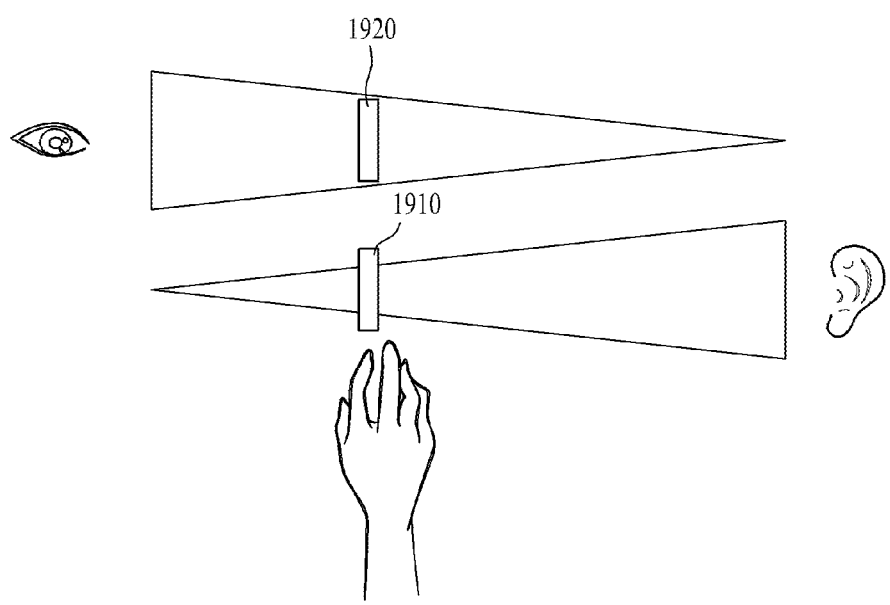
FIG. 19 is a diagram showing a still further example of a control interface for the HMD according to the present invention.

FIG. 19 is a diagram showing a further example of a control interface for the HMD according to the present invention. Similar to FIG. 18, FIG. 19 shows the example in which a control interface for an audio output and a control interface for a video output are separated from each other.

In the example of FIG. 19, an indicator 1910 for adjusting an audio output of the HMD and an indicator 1920 for adjusting a video output of the HMD are moved together in response to a user's touch signal. The area representing the data output level is changed (e.g., its color may change, etc.) according to positions of the respective indicators 1910 and 1920, which advantageously assists the user in intuitively recognizing the data output level.

The examples of receiving an input signal to move an indicator of a control interface from the user via an input unit provided in the HMD have been described above. However, even if the HMD is not equipped with the input unit, a user's input signal may be received from an external device that is communicating with the HMD. As such, the HMD may receive an input signal via a wired/wireless network from an external device, and adjust an audio output and a video output of the HMD accordingly as discussed herein.

Figure 20:
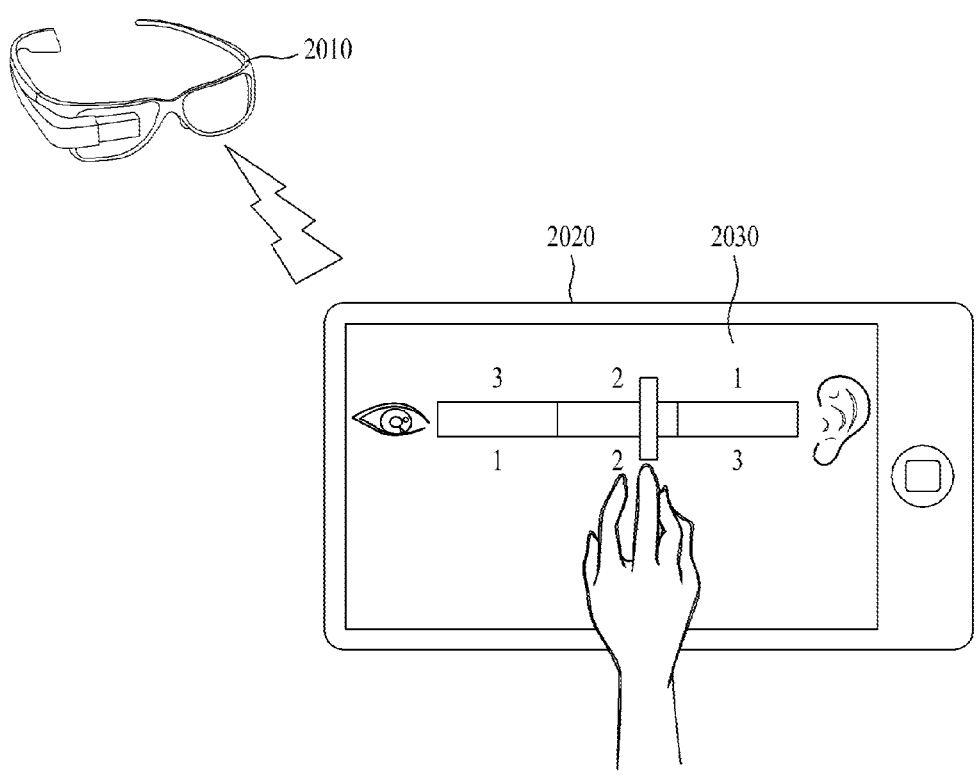
FIG. 20 is a diagram showing an example of adjusting an audio output and a video output in relation to each other via communication between the HMD and an external device according to the present invention.

FIG. 20 is a diagram showing an example of adjusting an audio output and a video output of the HMD in relation to each other via communication between the HMD and an external device according to the present invention. As shown in FIG. 20, a control interface 2030 to adjust an audio output and a video output of an HMD 2010 may be displayed on a mobile device 2020 such as a smart phone, a laptop, a tablet, etc. The HMD 2010 can send the data on the control interface 2030 to the mobile device 2020 for displaying the control interface 2030 on the mobile device 2020, or the mobile device 2020 can generate and display the control interface 2030 on its display and communicate the inputs associated with the control interface 2030 to the HMD 2010.

The mobile device 2020 may transmit an input signal from the user to adjust an indicator included in the control interface 2030, and the HMD 2010 may adjust the data output levels of the audio output and the video output upon receiving the input signal from the mobile device 2020.

Since the HMD 2010 is a device that the user wears and the mobile device 2020 is a portable device that the user carries, the HMD 2010 and the mobile device 2020 may often maintain communication therebetween. Thus, if the mobile device 2020 can display the control interface 2030 of the HMD 2010 on the display screen of the mobile device 2020 and the HMD 2010 can receive a user's input to the displayed control interface 2030 from the mobile device 2020, then the HMD 2010 can control the output levels of its audio and video output according to the user's input as discussed above according to the present invention. This may provide user control convenience.

Thus, according to the example shown in FIG. 20, a communication unit may be further installed to the above-described HMD 200 as shown in FIG. 2. The communication unit may perform data transmission/reception by communicating with an external device using various protocols to receive a user's input signal from the external device communicating with the HMD 200. The external device can be the mobile device as shown in FIG. 20 or other electronic device.

Additionally, the video output unit 220 of the HMD 200 may display an image based on a control command of the external device (for example, a mobile device) that is operating in conjunction with the HMD 200. The audio output unit 230 of the HMD 200 may output audio based on a control command of the mobile device that is operating in conjunction with the HMD 200.

Figure 21:
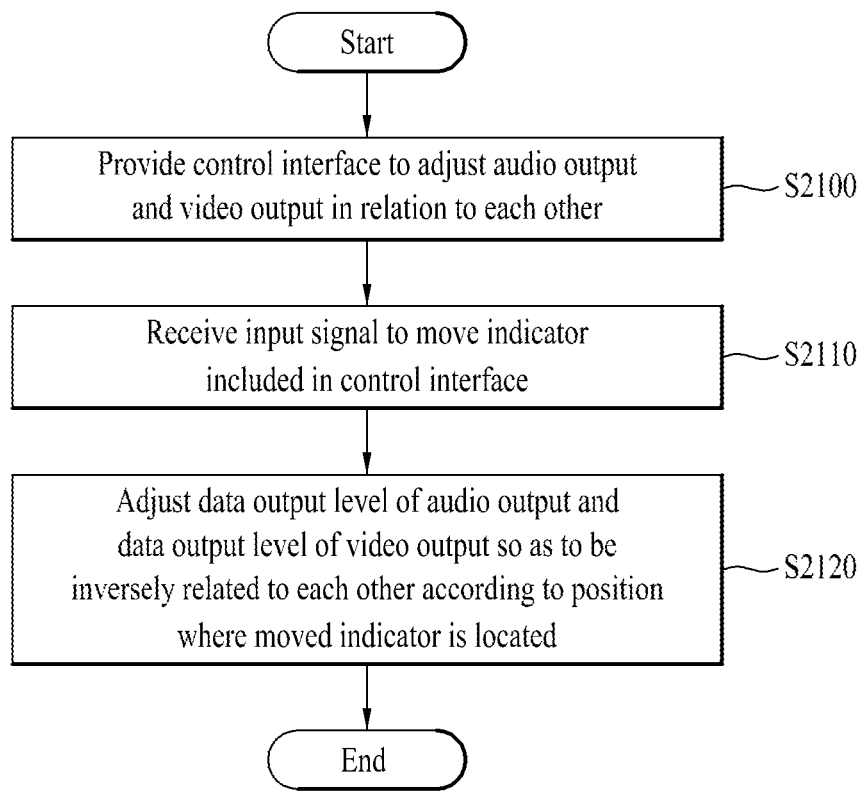
FIG. 21 is a flowchart showing a method for controlling the HMD according to an embodiment of the present invention.

FIG. 21 is a flowchart showing a method for controlling the HMD according to an embodiment of the present invention.

First, the HMD according to this embodiment of the present invention provides a control interface to adjust an audio output of the HMD and a video output of the HMD in relation to each other (S2100). The control interface, as described above with reference to FIGS. 3, 4, 18 and 19, may include an indicator to adjust the data output levels between the audio output and the video output, e.g., in an inversely related to each other.

The HMD receives an input signal corresponding to the user's input to move the indicator included in the control interface (S2110). The HMD sets or adjusts the data output levels of the audio output and the video output so as to be inversely related to each other according to the input signal corresponding to the moved location of the indicator of the control interface (S2120).

For example, as described above with reference to FIGS. 9 and 10, the HMD may automatically decrease the data output level of the video output while increasing the data output level of the audio output if the indicator of the control interface is moved to a position where the data output level of the audio output is to be increased, and may decrease the data output level of the audio output while increasing the data output level of the video output if the indicator of the control interface is moved to a position where the data output level of the video output is to be increased. Such adjustments may be made so that the audio and video outputs are at levels inversely related to each other.

The data output level of the audio output may include an output level related to at least one of an output volume, output time, and output data quantity of the audio output. Also, the data output level of the video output may include an output level related to at least one of the size of an output region, output resolution, output time, and output data quantity of the video output. In this case, the example in which the data output level of the audio output or the video output refers to that related to the data output quantity has been described above with reference to FIG. 11.

The HMD, as described above with reference to FIGS. 4 and 5, may block the video output if the indicator passes through a first critical point with respect to an audio output on a slide bar, or may block the audio output if the indicator passes through a second critical point with respect to a video output.

In the case in which the video output is blocked, the HMD may attempt to detect the presence of the user's eyes at a preset frequency, and again display a control interface if the user's eyes are detected to be present. The detection that the user's eyes are present near the HMD means that the user can view a video output of the HMD or that the user is wearing the HMD. Thus, if the user's eyes are detected, the HMD may automatically display a control interface to the user to adjust the data output level of a video output, so as to allow the user to utilize the video output according to the user's preference.

Even in the case in which the video output is not blocked, the HMD may attempt to detect the presence of the user's eyes near the HMD at a preset frequency if the preset data output level of an audio output is greater than the data output level of the video output. That is, if the user's eyes are detected to be present near the HMD, the HMD may display the control interface to allow the user to increase the data output level of the video output as desired.

As described above with reference to FIG. 8, if the indicator on the slide bar of the control interface passes through the first critical point, the HMD may provide a control interface after changing a UI of the control interface, in order to re-adjust the data output level of the audio output. Then, the HMD may set the audio output to the data output level corresponding to a position where the movement of the indicator is completed. This is equally applied even to the video output when the indicator on the slide bar passes through the second critical point.

Also, as described above with reference to FIGS. 16 and 17, the HMD may compare the data output levels of the audio output and the video output with each other, thereby setting one output having a greater data output level to be a main output and the other one having a smaller data output level to be a sub output. In this way, the HMD may allow the user to re-adjust the data output level of at least one of the main output and the sub output, thereby allowing the user to use a desired data output level as desired.

Although the respective drawings have been described individually for convenience of explanation, the HMD may be designed such that the embodiments illustrated in the respective drawings may be merged to realize a new embodiment. Also, design of a computer readable recording medium in which programs to execute the above-described embodiments are recorded is within the scope of the present invention.

The HMD and the control method thereof according to the present invention may not be limited to the configurations and methods of the above-described embodiments and examples, and some or all of the respective embodiments and examples may be selectively combined to accomplish various modifications of these embodiments and examples.

Meanwhile, the method for controlling the HMD according to the embodiments of the present invention may be implemented as computer code or software that can be written on a processor readable recording medium. The processor readable recording medium may be any type of recording device in which data is stored in a processor readable manner. Examples of the processor readable recording medium include a ROM, a RAM, a CD-ROM, a magnetic tape, a floppy disc, an optical data storage device, etc. Also, the processor readable recording medium may be a carrier wave (e.g., data transmission over the Internet). The processor readable recording medium can be distributed over a plurality of computer systems connected to a network so that processor readable code is written thereto and executed therefrom in a decentralized manner.

As is apparent from the above description, according to an embodiment of the present invention, an HMD is capable of automatically adjusting an audio output and a video output in relation to each other or in an inversely related to each other according to user environment, resulting in the enhanced user convenience.

Further, according to another embodiment of the present invention, if the HMD decreases the data output level of an audio output of the HMD, the data output level of a video output of the HMD is automatically increased at the same time by the HMD. Such adjustments can be inversely proportionally made. This ensures that the user can receive data conveniently even when having difficulty in utilizing the audio output.

Furthermore, according to another embodiment of the present invention, if the HMD decreases the data output level of a video output of the HMD, the data output level of an audio output of the HMD is automatically increased by the HMD at the same time. Such adjustments can be inversely proportionally made. This ensures that the user can receive data conveniently even when having difficulty in utilizing the video output.

According to an embodiment, the HMD can have a touch pad (e.g., on the side or frame portion of the HMD) which the user can touch to make the user's selection of the output level(s) on the slide bar. The user's selection can also be made via the user's voice, i.e., the output level control operation of the HMD can be voice-activated and voice-driven.

In addition, according to a further embodiment of the present invention, the HMD provides a control interface to adjust an audio output and a video output in inverse relation to each other. Thus, the user can adjust the audio output and the video output simultaneously via a single user operation.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

In this specification, both a device invention and a method invention have been described, and explanations of both inventions may be applied complementally as necessary.

What is claimed is:

1. A method of controlling a head mounted display that adjusts an audio output and a video output of the head mounted display in relation to each other, the method comprising:
    providing a first user interface of a control interface for adjusting the audio output and the video output in relation to each other, wherein the first user interface includes an indicator for adjusting a data output level of the audio output and a data output level of the video output in relation to each other;
    receiving, by the head mounted display, an input signal corresponding to a movement of the indicator; and
    adjusting, by the head mounted display, the data output level of the audio output and the data output level of the video output so as to be inversely related to each other according to the received input signal.

2. The method of claim 1, wherein the first user interface of the control interface includes a slide bar on which the indicator is movable by a user to adjust the data output levels of the audio output and the video output.

3. The method of claim 2, wherein the adjusting step decreases the data output level of the video output when the indicator is moved by the user to a position for increasing the data output level of the audio output, and
    wherein the adjusting step decreases the data output level of the audio output when the indicator is moved by the user to a position for increasing the data output level of the video output.

4. The method of claim 2, wherein the slide bar includes at least a first critical point for the audio output and a second critical point for the video output, and
    wherein the method further comprises:
    blocking, by the head mounted display, the video output when the indicator is moved beyond the first critical point on the slide bar; and
    blocking, by the head mounted display, the audio output when the indicator is moved beyond the second critical point on the slide bar.

5. The method of claim 4, further comprising:
    when the indicator is moved beyond the first critical point on the slide bar, providing a second user interface of the control interface for re-adjusting the data output level of the audio output;
    receiving an input to the second user interface; and
    re-adjusting the data output level of the audio output to a specific data output level corresponding to the received input to the second user interface.

6. The method of claim 4, further comprising:
    when the indicator is moved beyond the second critical point on the slide bar, providing a third user interface of the control interface for re-adjusting the data output level of the video output;
    receiving an input to the third user interface; and
    re-adjusting the data output level of the video output to a specific data output level corresponding to the received input to the third user interface.

7. The method of claim 1, wherein the data output level of the audio output is related to at least one of:
    an output volume of the audio output,
    an output time of the audio output, and
    an output data quantity of the audio output.

8. The method of claim 1, wherein the data output level of the audio output is related to an output data quantity of the audio data, and
    wherein the data output level of the audio output includes a first level at which no data is output, a second level at which an occurrence of an event is output as an alarm sound, and a third level at which audio content associated with the occurrence of the event is output.

9. The method of claim 1, wherein the data output level of the video output is related to at least one of:
    a size of an output area of the video output,
    an output resolution of the video output,
    an output time of the video output, and
    an output data quantity of the video output.

10. The method of claim 1, wherein the data output level of the video output is related to an output data quantity of the video output, and
    wherein the data output level of the video output includes a first level at which no data is displayed, a second level at which an occurrence of an event is displayed using numbers or icons, and a third level at which video content associated with the occurrence of the event is displayed.

11. The method of claim 1, further comprising:
    setting one output having a greater data output level as a main output and the other output having a smaller data output level as a sub output by comparing the data output level of the audio output and the data output level of the video output level with each other;
    providing a fourth user interface of the control interface for re-adjusting the data output level of at least one of the main output and the sub output; and
    re-adjusting the data output level of at least one of the main output and the sub output according to an input to the fourth user interface.

12. The method of claim 11, wherein the re-adjusting step re-adjusts either only the data output level of the main output or only the data output level of the sub output according to the input to the fourth user interface.

13. The method of claim 1, further comprising:
    detecting a presence of a user's eye adjacent to the head mounted display when the data output level of the audio output is greater than the data output level of the video output; and
    displaying the control interface when the detecting step detects the presence of the user's eye.

14. The method of claim 1, wherein the step of providing the first user interface includes displaying the first user interface on a display unit of the head mounted display.

15. The method of claim 1, wherein the step of providing the first user interface includes displaying the first user interface on a display unit of a mobile device configured to communicate with the head mounted display.

16. A head mounted display comprising:
an input unit;
an audio output unit configured to output audio data;
a video output unit configured to output video data; and
a controller configured to:
provide a first user interface of a control interface for adjusting the audio output and the video output in relation to each other, wherein the first user interface includes an indicator for adjusting a data output level of the audio output and a data output level of the video output in relation to each other,
receive, via the input unit, an input signal corresponding to a movement of the indicator, and
adjust the data output level of the audio output and the data output level of the video output so as to be inversely related to each other according to the received input signal.

17. The head mounted display of claim 16, wherein the first user interface of the control interface includes a slide bar on which the indicator is movable by a user to adjust the data output levels of the audio output and the video output.

18. The head mounted display of claim 17, wherein the controller decreases the data output level of the video output when the indicator is moved by the user to a position for increasing the data output level of the audio output, and
wherein the controller decreases the data output level of the audio output when the indicator is moved by the user to a position for increasing the data output level of the video output.

19. The head mounted display of claim 17, wherein the slide bar includes at least a first critical point for the audio output and a second critical point for the video output, and
wherein the controller blocks the video output when the indicator is moved beyond the first critical point on the slide bar, and blocks the audio output when the indicator is moved beyond the second critical point on the slide bar.

20. The head mounted display of claim 19, wherein the controller is further configured to:
when the indicator is moved beyond the first critical point on the slide bar, provide a second user interface of the control interface for re-adjusting the data output level of the audio output,
receive an input to the second user interface, and
re-adjust the data output level of the audio output to a specific data output level corresponding to the received input to the second user interface.

21. The head mounted display of claim 19, wherein the controller is further configured to:
when the indicator is moved beyond the second critical point on the slide bar, provide a third user interface of the control interface for re-adjusting the data output level of the video output,
receive an input to the second user interface, and
re-adjust the data output level of the video output to a specific data output level corresponding to the received input to the third user interface.

22. The head mounted display of claim 16, wherein the data output level of the audio output is related to at least one of:
an output volume of the audio output,
an output time of the audio output, and
an output data quantity of the audio output.

23. The head mounted display of claim 16, wherein the data output level of the audio output is related to an output data quantity of the audio data, and
wherein the data output level of the audio output includes a first level at which no data is output, a second level at which an occurrence of an event is output as an alarm sound, and a third level at which audio content associated with the occurrence of the event is output.

24. The head mounted display of claim 16, wherein the data output level of the video output is related to at least one of:
a size of an output area of the video output,
an output resolution of the video output,
an output time of the video output, and
an output data quantity of the video output.

25. The head mounted display of claim 16, wherein the data output level of the video output is related to an output data quantity of the video output, and
wherein the data output level of the video output includes a first level at which no data is displayed, a second level at which an occurrence of an event is displayed using numbers or icons, and a third level at which video content associated with the occurrence of the event is displayed.

26. The head mounted display of claim 16, wherein the controller is further configured to:
set one output having a greater data output level as a main output and the other output having a smaller data output level as a sub output by comparing the data output level of the audio output and the data output level of the video output level with each other,
provide a fourth user interface of the control interface for re-adjusting the data output level of at least one of the main output and the sub output, and
re-adjust the data output level of at least one of the main output and the sub output according to an input to the fourth user interface.

27. The head mounted display of claim 26, wherein the controller re-adjusts either only the data output level of the main output or only the data output level of the sub output according to the input to the fourth user interface.

28. The head mounted display of claim 16, wherein the controller is further configured to:
detect a presence of a user's eye adjacent to the head mounted display when the data output level of the audio output is greater than the data output level of the video output, and
display the control interface when the controller detects the presence of the user's eye.

29. The head mounted display of claim 16, further comprising:
a display unit configured to display the first user interface under control of the controller.

30. The head mounted display of claim 16, wherein the controller provides the first user interface by displaying the first user interface on a display unit of a mobile device configured to communicate with the head mounted display.

* * * * *